US010691835B1

(12) United States Patent
Cheng et al.

(10) Patent No.: US 10,691,835 B1
(45) Date of Patent: *Jun. 23, 2020

(54) VERIFYING INTEGRITY OF DATA STORED IN A CONSORTIUM BLOCKCHAIN USING A PUBLIC SIDECHAIN

(71) Applicant: Alibaba Group Holding Limited, George Town (KY)

(72) Inventors: Long Cheng, Hangzhou (CN); Yanpeng Li, Hangzhou (CN); Zhiyuan Feng, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,334

(22) Filed: Feb. 3, 2020

Related U.S. Application Data

(63) Continuation of application No. 16/421,357, filed on May 23, 2019, now Pat. No. 10,552,641, which is a
(Continued)

(51) Int. Cl.
*G06F 21/64* (2013.01)
*H04L 9/32* (2006.01)
(Continued)

(52) U.S. Cl.
CPC ............ *G06F 21/64* (2013.01); *G06F 21/602* (2013.01); *G06F 21/645* (2013.01); *G06Q 20/10* (2013.01);
(Continued)

(58) Field of Classification Search
CPC ...... G06F 21/64; G06F 21/602; G06F 21/645; G06Q 20/10; H04L 9/00; H04L 9/0637;
(Continued)

(56) References Cited

U.S. PATENT DOCUMENTS

2016/0292672 A1* 10/2016 Fay ...................... G06Q 20/363
2017/0011460 A1* 1/2017 Molinari ............. H04L 63/0823
(Continued)

FOREIGN PATENT DOCUMENTS

CN        108092982     5/2018
CN        108924130    11/2018
(Continued)

OTHER PUBLICATIONS

Aiqing et al., "Towards Secure and Privacy-Preserving Data Sharing in e-Health Systems via Consortium Blockchain," Journal of Medical Systems, 2018, 42(8):18 pages.
(Continued)

*Primary Examiner* — Michael S McNally
(74) *Attorney, Agent, or Firm* — Fish & Richardson P.C.

(57) ABSTRACT

Implementations of the present specification include storing a data item in a consortium blockchain; generating a first data digest based on the stored data item; sending the first data digest to verification nodes to cryptographically signs it and stores the signed first data digest in a public blockchain; receiving a request to retrieve the stored data item; retrieving the requested data item from the consortium blockchain; generating a second data digest based on the retrieved data item; sending the second data digest to verification nodes so that each verification node signs the second data digest; receiving the signed second data digests from the plurality of verification nodes; retrieving the signed first data digests from the public blockchain; determining that the signed first data digests match the signed second data digests; and sending a response indicating the stored data item is unchanged to the request to retrieve the stored data item.

20 Claims, 7 Drawing Sheets

Related U.S. Application Data continuation of application No. PCT/CN2018/122559, filed on Dec. 21, 2018.

(51) Int. Cl.

| | | |
|---|---|---|
| *H04L 9/06* | (2006.01) | |
| *G06F 21/60* | (2013.01) | |
| *H04L 9/00* | (2006.01) | |
| *G06Q 20/10* | (2012.01) | |

(52) U.S. Cl.
CPC .............. *H04L 9/00* (2013.01); *H04L 9/0637* (2013.01); *H04L 9/0643* (2013.01); *H04L 9/3247* (2013.01); *H04L 2209/38* (2013.01)

(58) Field of Classification Search
CPC .. H04L 9/0643; H04L 9/3247; H04L 2209/38
USPC ........................................................ 713/176
See application file for complete search history.

(56) References Cited

U.S. PATENT DOCUMENTS

| | | | |
|---|---|---|---|
| 2017/0177855 A1* | 6/2017 | Costa Faidella | ...... H04L 9/3234 |
| 2018/0025435 A1 | 1/2018 | Karame et al. | |
| 2018/0101844 A1 | 4/2018 | Song et al. | |
| 2018/0103042 A1 | 4/2018 | Castagna et al. | |
| 2018/0139278 A1 | 5/2018 | Bathen et al. | |
| 2018/0189312 A1 | 7/2018 | Alas et al. | |
| 2018/0337770 A1 | 11/2018 | Bathen et al. | |
| 2018/0337787 A1 | 11/2018 | Uhr et al. | |
| 2019/0156429 A1 | 5/2019 | Beckmann et al. | |
| 2019/0228133 A1 | 7/2019 | Ansari et al. | |

FOREIGN PATENT DOCUMENTS

| | | |
|---|---|---|
| JP | 2011188029 | 9/2011 |
| JP | 2017157926 | 9/2017 |
| WO | WO 2017170679 | 10/2017 |
| WO | WO 2018080207 | 5/2018 |
| WO | WO 2018230581 | 12/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

EP European Extended Search Report in European Patent Application No. 18866464.3, dated Dec. 12, 2019, 10 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/122559, dated Sep. 30, 2019, 6 pages.

* cited by examiner

VERIFYING INTEGRITY OF DATA STORED IN A CONSORTIUM BLOCKCHAIN USING A PUBLIC SIDECHAIN

CROSS-REFERENCE TO RELATED APPLICATIONS

This application is a continuation of U.S. patent application Ser. No. 16/421,357, filed on May 23, 2019, which is a continuation of PCT Application No. PCT/CN2018/122559, filed on Dec. 21, 2018, and each application is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

Blockchain is a decentralized and temper-proof distributed data storage technology. User data and contracts are logically operated and stored on the chain in a public manner. In many scenarios, users need to meet privacy protection requirements and do not want their data and logics to be leaked to unauthorized parties.

Although cryptography can be used to enhance privacy protection for some specific scenario designs, a more versatile and efficient solution is desired to solve existing privacy issues of the blockchain operations.

SUMMARY

Implementations of the present specification include computer-implemented methods for storing and retrieving to-be-verified data associated with nodes of a blockchain network. More particularly, implementations of the present specification are directed to storing a data digest of the to-be-verified data associated with one or more consortium blockchain network nodes using a number of verification nodes, and retrieving the to-be-verified data and the stored data digests.

In some implementations, actions include storing a data item in a consortium blockchain maintained by a consortium blockchain network; generating a first data digest based on the stored data item; sending the first data digest to verification nodes, so that each verification node cryptographically signs the first data digest and stores its signed first data digest in a public blockchain maintained by a public blockchain network; receiving a request to retrieve the stored data item; in response to receiving the request, retrieving the requested data item from the consortium blockchain; generating a second data digest based on the retrieved data item; sending the second data digest to the verification nodes so that each verification node cryptographically signs the second data digest and returns its signed second data digest; receiving the signed second data digests from the verification nodes; retrieving the signed first data digests from the public blockchain; determining that the signed first data digests match the signed second data digests; and in response to the determining, sending a response to the request to retrieve the stored data item, the response indicating that the stored data item has not changed since it was stored. Other implementations include corresponding systems, apparatus, and computer programs, configured to perform the actions of the methods, encoded on computer storage devices.

In some implementations, a non-transitory computer-readable storage medium is coupled to one or more computers and configured with instructions executable by the one or more computers to: store a data item in a consortium blockchain maintained by a consortium blockchain network; generate a first data digest based on the stored data item; send the first data digest to verification nodes so that each verification node cryptographically signs the first data digest and stores its signed first data digest in a public blockchain maintained by a public blockchain network; receive a request to retrieve the stored data item; in response to receive the request, retrieving the requested data item from the consortium blockchain; generate a second data digest based on the retrieved data item; send the second data digest to verification nodes so that each verification node cryptographically signs the second data digest and returns its signed second data digest; receive the signed second data digests from the verification nodes; retrieve the signed first data digests from the public blockchain; determine that the signed first data digests match the signed second data digests; and in response to the determine, sending a response to the request to retrieve the stored data item, the response indicating that the stored data item has not changed since it was stored.

In some implementations, a system includes one or more computers; and one or more computer-readable memories coupled to the one or more computers and configured with instructions executable by the one or more computers to: store a data item in a consortium blockchain maintained by a consortium blockchain network; generate a first data digest based on the stored data item; send the first data digest to verification nodes so that each verification node cryptographically signs the first data digest and stores its signed first data digest in a public blockchain maintained by a public blockchain network; receive a request to retrieve the stored data item; in response to receive the request, retrieving the requested data item from the consortium blockchain; generate a second data digest based on the retrieved data item; send the second data digest to verification nodes so that each verification node cryptographically signs the second data digest and returns its signed second data digest; receive the signed second data digests from the verification nodes; retrieve the signed first data digests from the public blockchain; determine that the signed first data digests match the signed second data digests received; and in response to the determine, sending a response to the request to retrieve the stored data item, the response indicating that the stored data item has not changed since it was stored. These and other implementations may each optionally include one or more of the following features:

A first feature, combinable with any of the following features, wherein the verification nodes are computing devices participating in the public blockchain network.

A second feature, combinable with any of the following features, further includes storing a smart contract in the public blockchain, wherein the smart contract is configured to provide a monetary reward to the verification nodes in response to receiving the requested signed second data digests from the verification nodes.

A third feature, combinable with any of the following features, wherein generating the first data digest includes calculating a hash of the stored data item.

A fourth feature, combinable with any of the following features, wherein each verification node is configured to cryptographically sign the first data digest using a private key associated with that verification node.

A fifth feature, combinable with any of the following features, wherein sending the first data digest to the verification nodes includes broadcasting the first data digest to the public blockchain network.

A sixth feature, combinable with any of the following features, wherein retrieving the signed first data digests from the public blockchain includes identifying the signed first data digests based on an identifier associated with the stored data item and stored in the public blockchain.

The present specification also provides one or more non-transitory computer-readable storage media coupled to one or more processors and having instructions stored thereon which, when executed by the one or more processors, cause the one or more processors to perform operations in accordance with implementations of the methods provided herein.

The present specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The described blockchain network can be used to verify the integrity of the data stored in the blockchain network. It involves a large number of nodes that can participate in the consensus process, thereby ensuring the integrity of the data. In addition, the described techniques provide an incentive mechanism based on smart contracts to increase node participation in the public sidechain.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the present specification are set forth in the accompanying drawings and the description below. Other features and advantages of the present specification will be apparent from the description and drawings, and from the claims.

DESCRIPTION OF DRAWINGS

Like reference symbols in the various drawings indicate like elements.

DETAILED DESCRIPTION

Figure 1:
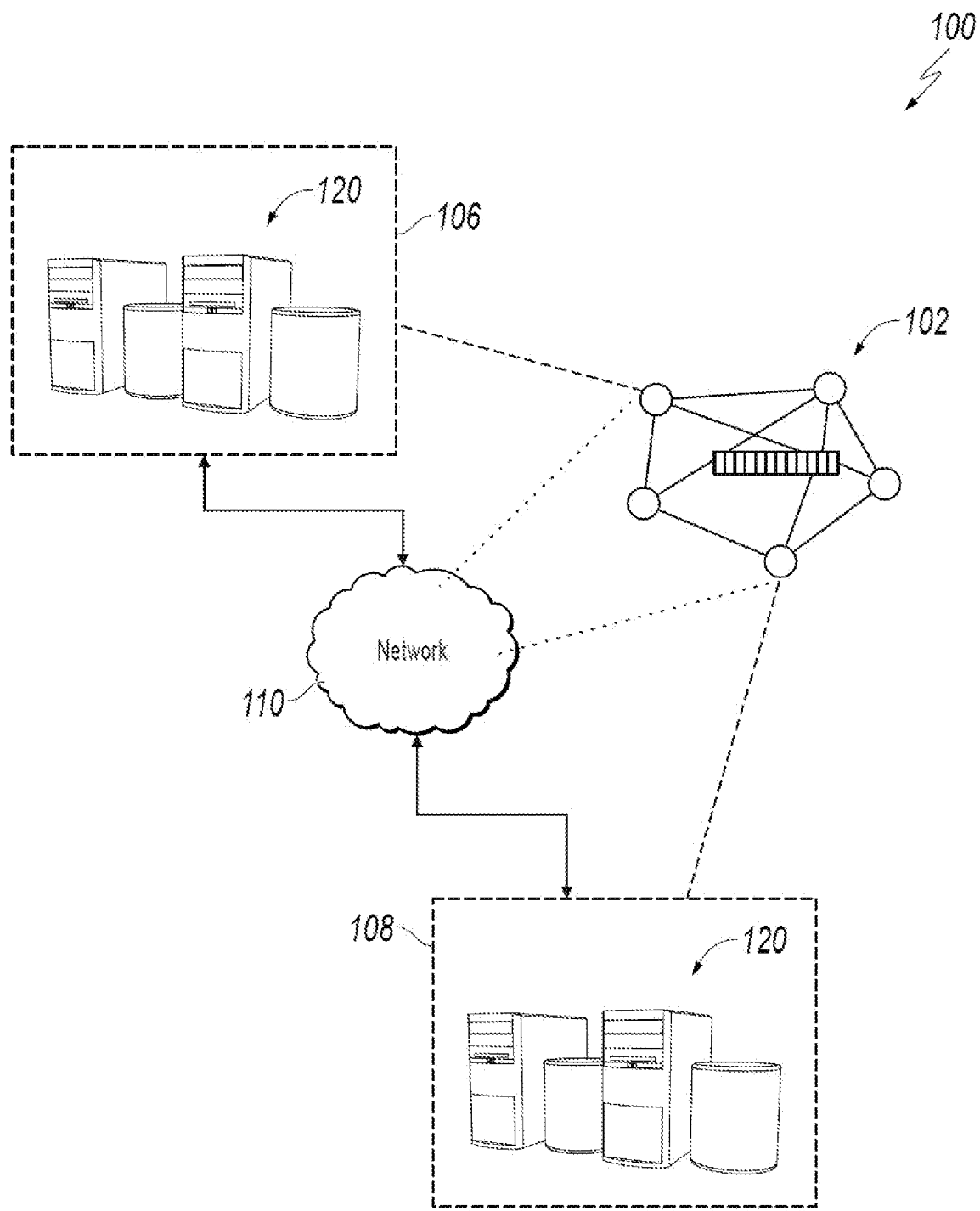
FIG. 1 depicts an example of an environment that can be used to execute implementations of the present specification.

Implementations of the present specification include computer-implemented methods for storing and retrieving to-be-verified data associated with nodes of a blockchain network. More particularly, implementations of the present specification are directed to storing a data digest of the to-be-verified data associated with one or more consortium blockchain network nodes using a number of verification nodes, and retrieving the to-be-verified data and the stored data digests.

To provide further context for implementations of the specification, and as introduced above, distributed ledger systems (DLSs), which can also be referred to as consensus networks (e.g., made up of peer-to-peer nodes), and blockchain networks, enable participating entities to securely, and immutably conduct transactions, and store data. The term blockchain is used herein to generally refer to a DLS without reference to any particular use case.

A blockchain is a data structure that stores transactions in a way that the transactions are immutable, and can be subsequently verified. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a data structure for storing transactions, a blockchain network is a network of computing nodes that manage, update, and maintain one or more blockchains. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. Example public blockchain networks include particular peer-to-peer payment networks that leverage a distributed ledger, referred to as blockchain. As noted above, the term blockchain, however, is used to generally refer to distributed ledgers without particular reference to any particular blockchain network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. Examples of consensus protocols include, without limitation, proof-of-work (POW), proof-of-stake (POS), and proof-of-authority (POA). POW is referenced further herein as a non-limiting example.

In general, a private blockchain network private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

A blockchain is a tamper-proof, shared digital ledger that records transactions in a public or private peer-to-peer network. The ledger is distributed to all member nodes in the network, and the history of asset transactions occurring in the network is permanently recorded in the block. Prior to participating in a transaction, a node on the blockchain may need to execute computations using various techniques. Under current solutions, because each blockchain is independent, a node of one blockchain cannot communicate with other chains. For example, a node cannot read data from other blockchains or exchange data with other blockchains. In addition, even if a node does not need data from other blockchains to execute a computation, performing such computations entirely on a blockchain can consume a lot of time and computational resources of the blockchain, if it requires complicated computational logics and protocols.

Implementations of the specification are described in further detail herein with reference to a consortium blockchain network, which is public among the participating entities. It is contemplated, however, that implementations of the specification can be realized in any appropriate type of blockchain network.

Implementations of the specification are described in further detail herein in view of the above context. More particularly, and as introduced above, implementations of the specification are directed to providing an off-chain smart contract service capable of operating cross-chain data in a trusted execution environment.

Specifically, the described techniques introduce a public auxiliary blockchain (also referred to as a "sidechain") that is used to verify the integrity of the data stored in the consortium blockchain. Because the sidechain is public, a large number of nodes can participate in the consensus process, thereby ensuring the integrity of the data in the sidechain. A representation of each transaction on the consortium blockchain is stored in the sidechain. Thus, in order to alter the data in the consortium blockchain, an attacker must also make a corresponding alteration to the public sidechain. Making such an alteration in the public sidechain will be much more difficult than in the consortium blockchain, due to the number of nodes involved in the consensus process for the public sidechain. In this way, the integrity of the data in the consortium blockchain may be ensured. In addition, the described techniques provide an incentive mechanism based on smart contracts to increase node participation in the public sidechain. A smart contract can be a computer agreement designed to disseminate, verify, or enforce contracts in an informational manner. Smart contracts allow trusted transactions to be performed without a third-party involvement. These transactions are traceable and irreversible.

The described techniques can have a variety of applications. For example, during a copyright infringement litigation, the plaintiff needs to provide the court with some type of digital evidence to show the exact time she created the original work. If the digital evidence submitted by the plaintiff is originally stored at a consortium blockchain, it may not be able to meet the required burden of proof, since the court cannot determine that the digital evidence has not been tampered with. To establish an evidentiary record that would be accepted by the court, the plaintiff can store the data evidence using the described techniques through an verification system. At the time of evidence submission, the plaintiff can submit the digital evidence stored at the consortium blockchain, along with copies of digital evidence submitted by the verification nodes. This way, the court will be more likely to recognize the authenticity of the digital evidence because a large number of verification nodes are attesting to the authenticity of the digital evidence.

Aside from the above-discussed example, the described techniques can benefit many other applications that make use of the blockchain technology.

FIG. 1 depicts an example of an environment 100 that can be used to execute implementations of the specification. In some examples, the environment 100 enables entities to participate in a blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the blockchain network 102. In general the network 110 represents one or more communication networks. In some cases, the computing devices 106, 108 can be nodes of a cloud computing system (not shown), or can each computing device 106, 108 be a separate cloud computing system including a number of computers interconnected by a network and functioning as a distributed processing system.

In the depicted example, the computing systems 106, 108 can each include any appropriate computing system that enables participation as a node in the blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the blockchain network 102. For example, the computing system 106 can host computer-implemented services of a first entity (e.g., Participant A), such as transaction management system that the first entity uses to manage its transactions with one or more other entities (e.g., other participants). The computing system 108 can host computer-implemented services of a second entity (e.g., Participant B), such as transaction management system that the second entity uses to manage its transactions with one or more other entities (e.g., other participants). In the example of FIG. 1, the blockchain network 102 is represented as a peer-to-peer network of nodes, and the computing systems 106, 108 provide nodes of the first entity, and second entity respectively, which participate in the blockchain network 102.

Figure 2:
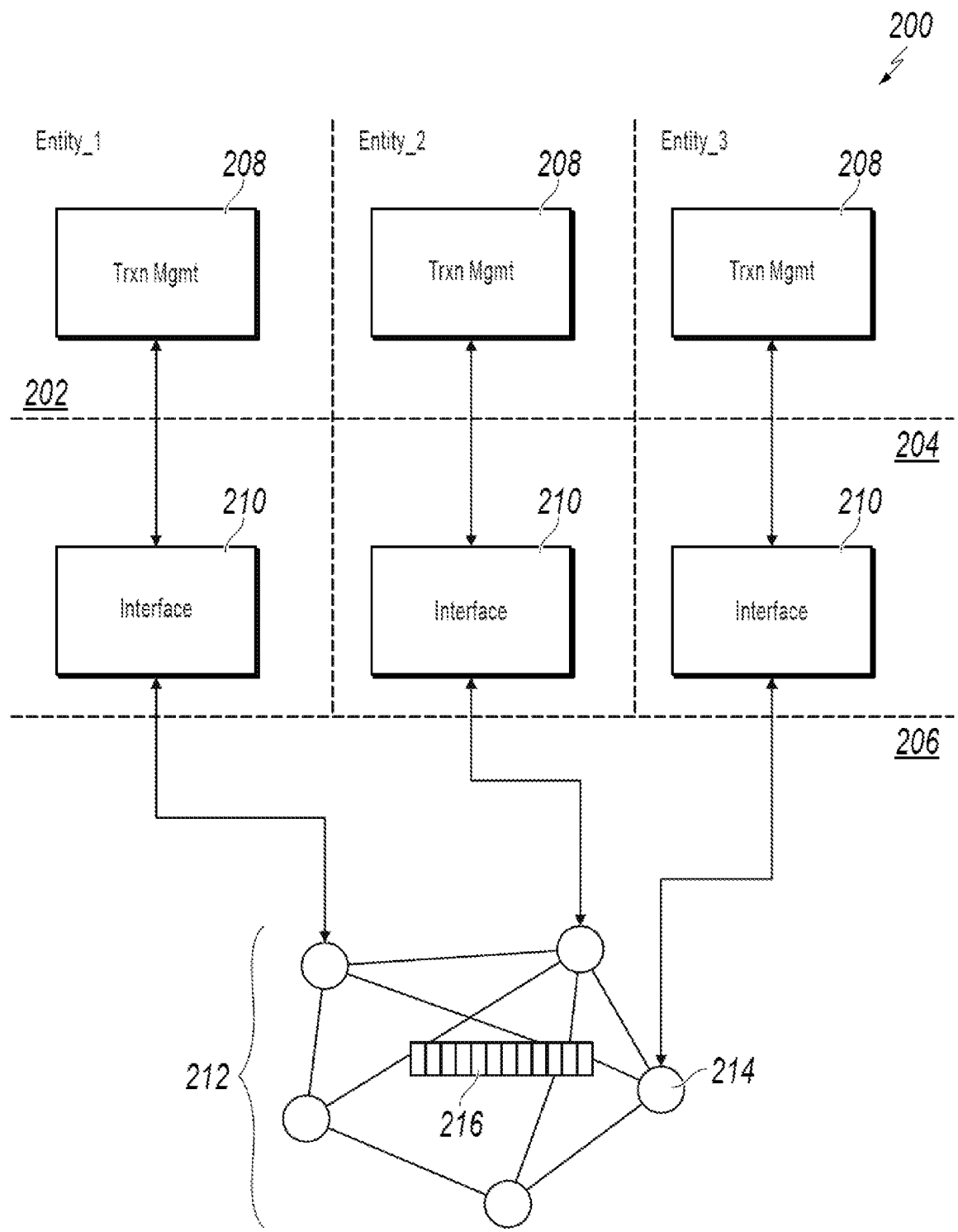
FIG. 2 depicts an example of a conceptual architecture in accordance with implementations of the present specification.

FIG. 2 depicts an example of a conceptual architecture 200 in accordance with implementations of the specification. The example of a conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a number of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, 206 store respective, complete copies 216', 216'', 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of transactions can include, without limitation, exchanges of something of value (e.g., assets, products, services, and currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An examples of hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and compete to have a block added to the blockchain. Such nodes are referred to as miners (or minder nodes). POW, introduced above, is used as a non-limiting example.

The miner nodes execute the consensus process to add transactions to the blockchain. Although multiple miner nodes participate in the consensus process, only one miner node can write the block to the blockchain. That is, the miner nodes compete in the consensus process to have their block added to the blockchain. In further detail, a miner node periodically collects pending transactions from a transaction pool (e.g., up to a predefined limit on the number of transactions that can be included in a block, if any). The transaction pool includes transaction messages from participants in the blockchain network. The miner node constructs a block, and adds the transactions to the block. Before adding the transactions to the block, the miner node checks whether any of the transactions are already included in a block of the blockchain. If a transaction is already included in another block, the transaction is discarded.

The miner node generates a block header, hashes all of the transactions in the block, and combines the hash value in pairs to generate further hash values until a single hash value is provided for all transactions in the block (the Merkle root hash). This hash is added to the block header. The miner also determines the hash value of the most recent block in the blockchain (i.e., the last block added to the blockchain). The miner node also adds a nonce value, and a timestamp to the block header. In a mining process, the miner node attempts to find a hash value that meets required parameters. The miner node keeps changing the nonce value until finding a hash value that meets the required parameters.

Every miner in the blockchain network attempts to find a hash value that meets the required parameters, and, in this way, compete with one another. Eventually, one of the miner nodes finds a hash value that meets the required parameters, and advertises this to all other miner nodes in the blockchain network. The other miner nodes verify the hash value, and if determined to be correct, verifies each transaction in the block, accepts the block, and appends the block to their copy of the blockchain. In this manner, a global state of the blockchain is consistent across all miner nodes within the blockchain network. The above-described process is the POW consensus protocol.

A non-limiting example is provided with reference to FIG. 2. In this example, Participant A wants to send an amount of fund to Participant B. Participant A generates a transaction message (e.g., including From, To, and Value fields), and sends the transaction message to the blockchain network, which adds the transaction message to a transaction pool. Each miner node in the blockchain network creates a block, and takes all transactions from the transaction pool (e.g., up to a predefined limit on the number of transaction that can be added to a block, if any), and adds the transactions to the block. In this manner the transaction published by Participant A is added to the blocks of the miner nodes.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Examples of cryptographic methods include, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
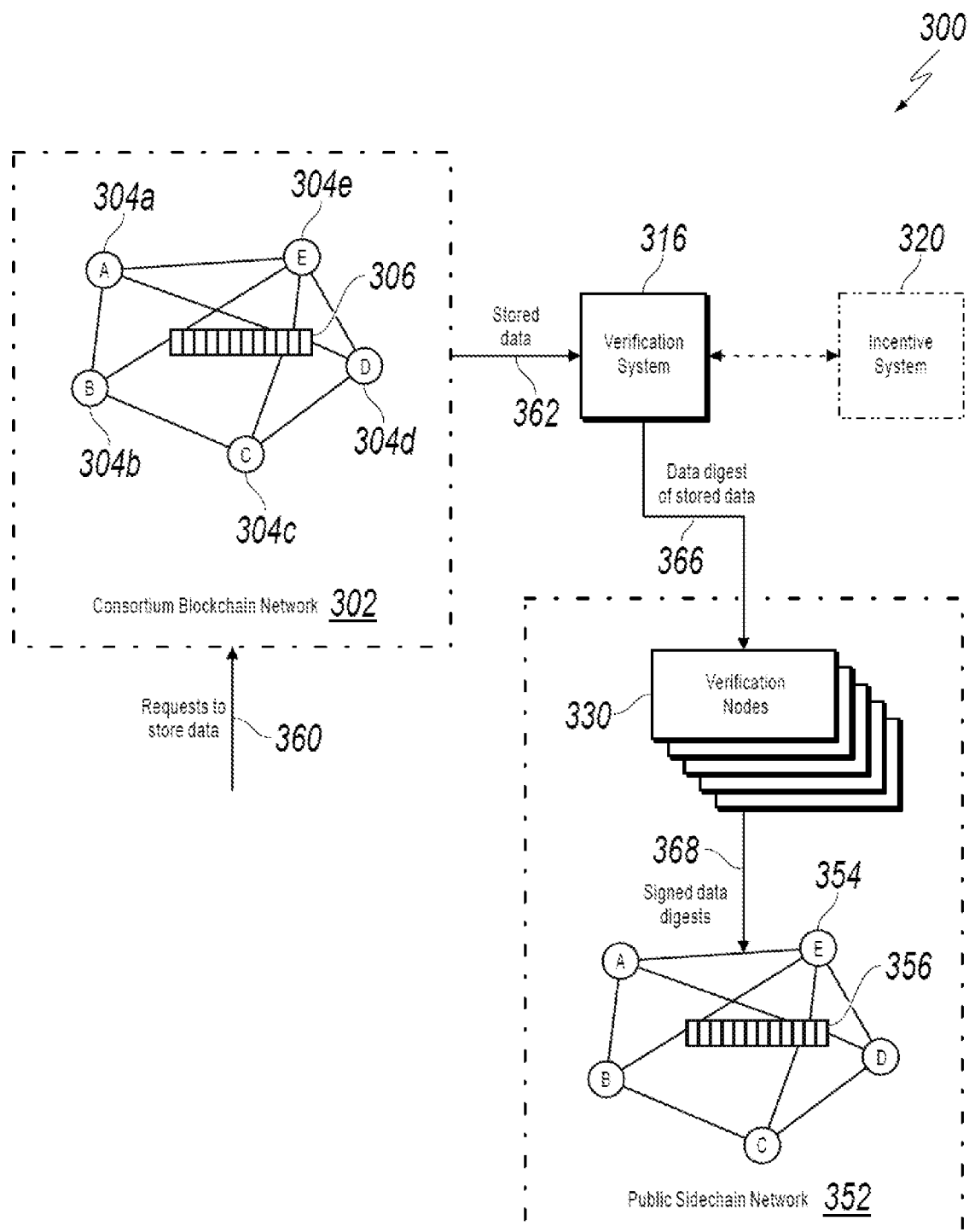
FIG. 3 depicts an example of a system that can be used to execute implementations of the present specification in accordance with implementations of the present specification.

FIG. 3 depicts an example of a system 300 that can be used to execute implementations of the present specification in accordance with implementations of the present specification.

As illustrated in FIG. 3, the system 300 includes a consortium blockchain network 302 including nodes 304a-304e maintaining a consortium blockchain 306. The system 300 includes a verification system 316, an incentive system 320, and a public sidechain network 352. The public sidechain network 352 includes a plurality of verification nodes 330, a public blockchain 356, and public blockchain nodes (e.g., 354) maintaining the public blockchain 356.

In operation, the consortium blockchain network 302 (i.e., the nodes 304a-e) receive requests to store data (360). The nodes 304a-e store the data in the consortium blockchain 306 according to the mechanisms described above. The verification system 316 receives the stored data once it is added to the blockchain 306 (at 362). For example, the verification system can monitor the consortium blockchain network 302 and determine that the data has been stored once a consensus is reached by the nodes 304a-e on a chain including the data.

In some implementations, the verification system 316 is responsible for the interaction between the consortium blockchain network 302 and the public sidechain network 352. In operation, the verification system 316 (at 366) sends a data digest of the stored data to verification nodes 330. In some implementations, the verification nodes 330 are computing devices participating in the public sidechain network 352. There may be a large number (e.g., thousands) of verification nodes 330. In some cases, the verification system 316 may broadcast the data digest to the public sidechain network 352. The verification nodes 330, upon receiving the data digest, cryptographically sign the data digest using their private key. Each verification node then attempts to store its signed data digest in the public blockchain 356. In some implementations, all signed data digests produced by the verification nodes 330 are stored in the public blockchain 356. In some cases, a certain number of the signed data digests are stored in the public blockchain 356 and the others are discarded. This number can be a function of the consensus mechanisms used in the public sidechain network 352.

The system 300 may also include an incentive system 320. In some implementations, the incentive system 320 may generate a smart contract to be stored in the public blockchain 356. The smart contract may be configured, when executed by the public sidechain network, to provide a monetary reward to verification nodes 330 that participate in the verification of the stored data. For example, a verification node 330 that successfully includes its signed data digest in the public blockchain 356 may receive the monetary reward automatically through execution of the smart contract. In some cases, a verification node 330 that participates in the verification of data requested from the consortium blockchain (see FIG. 5, below) may receive the monetary reward automatically through execution of the smart contract.

Figure 4:
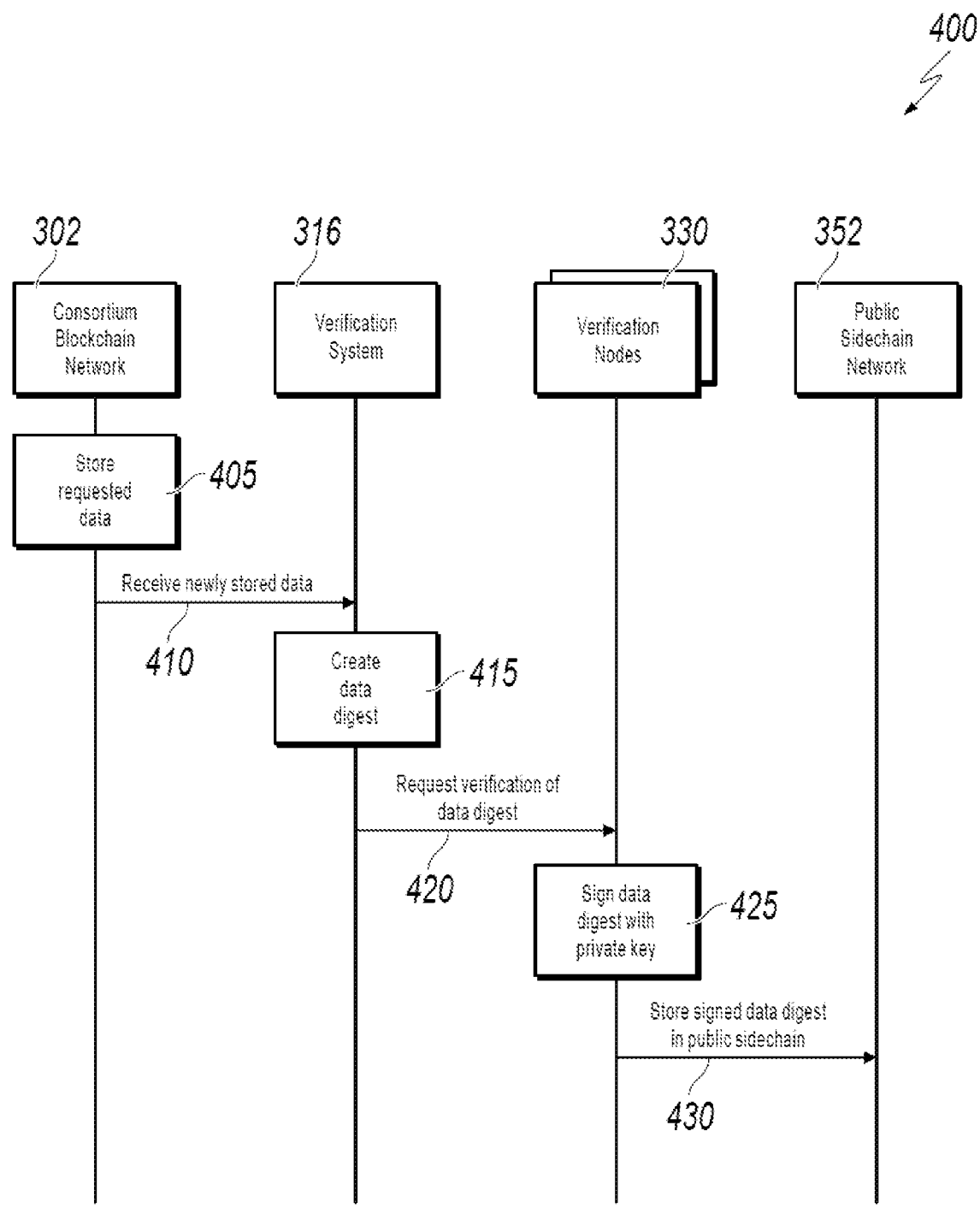
FIG. 4 depicts an example of a process of storing data in a consortium blockchain network and an associated public sidechain network according to aspects of the present specification.

FIG. 4 depicts an example process 400 of storing data in a consortium blockchain network and an associated public sidechain network according to aspects of the present specification.

At 405, a data item is stored in the consortium blockchain network 302. At 410, the verification system 316 receives the newly stored data from the consortium blockchain network 302, such as by communicating with nodes participating in the network. At 415, the verification system 316 creates a data digest of the newly stored data item. For example, the verification system 316 may create the data digest by generating a hash of the stored data item using a hashing algorithm, such as, for example, Secure Hash Algorithm 1 (SHA-1), SHA-256, Rivest-Shamir-Adleman (RSA), or other known algorithms.

At 420, the verification system 316 requests verification of the data digest by the verification nodes 330. In response, at 425, the verification nodes 330 cryptographically sign the data digest using their private keys. At 430, the verification nodes 330 store their individual signed data digests in the public blockchain 356 managed by the public sidechain network 352. As described above, in some implementations, only a certain number of the data digests will be stored in the public blockchain 356 depending on the consensus mechanisms employed by the public sidechain network 352.

Figure 5:
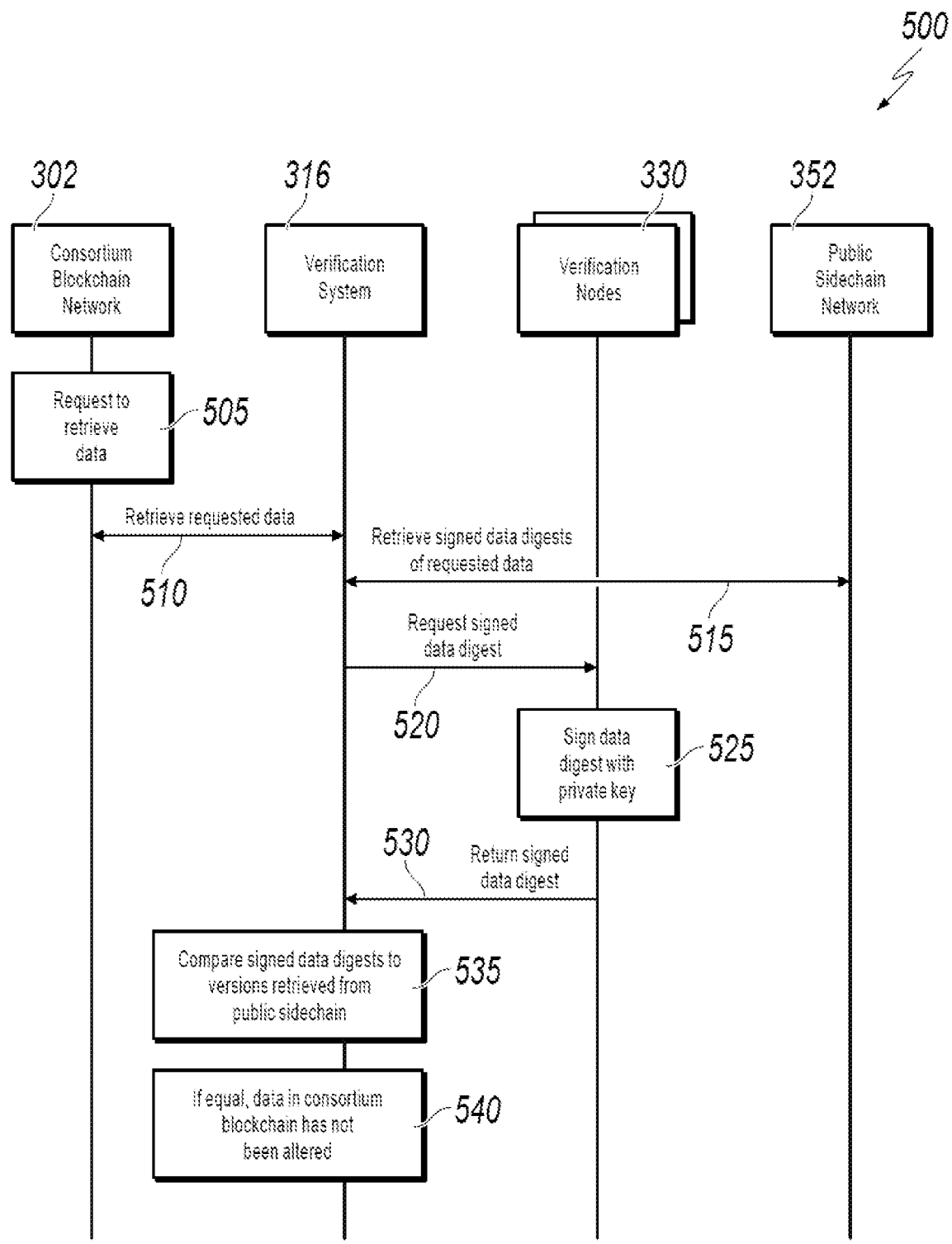
FIG. 5 depicts an example of a process of retrieving data from the consortium blockchain network, and verifying retrieved data based on the public sidechain network according to aspects of the present specification.

FIG. 5 depicts an example process of retrieving data from the consortium blockchain network 302, and verifying retrieved data based on the public sidechain network 352. At 505, a request to retrieve data is received by the consortium blockchain network 302 (i.e., by a node participating in the consortium blockchain network). In some implementations, this request may be received by the verification system 316.

At 510, the verification system 316 retrieves the requested data from the consortium blockchain network 302, such as by obtaining the requested data from a consensus version of the consortium blockchain 306. At 515, the verification system 316 retrieves the signed data digests associated with the requested data from the public sidechain network 352. In some cases, the signed digests may be retrieved based on an identifier associated with the stored data, such as a timestamp or other identifier stored in the public blockchain 356 along with the signed data digests by the verification nodes 330.

At 520, the verification system 316 requests signed data digest of the retrieved data from the verification nodes 330. The verification system 316 may create the data digest of the retrieved data using the hashing algorithms described above. At 525, the verification system 316 sends the data digests to the verification nodes 330, so that verification nodes 330 can each cryptographically sign the data digest of the retrieved data, and at 530 return their signed version of the data digest to the verification system 316.

At 535, the verification system 316 compares the signed data digests of the retrieved data received from the verification nodes 330 to the signed data digests retrieved from the public blockchain 356 (which were created when the data was originally stored in the consortium blockchain network, see FIG. 4). If the signed data digests of the retrieved data received from the verification nodes 330 match the signed data digests retrieved from the public blockchain 356, the stored data in the consortium blockchain network 302 has not changed since it was originally stored (540).

This process verifies that the requested data has not been changed, because if it has not changed, the value of the signed data digests of the retrieved data produced by the verification nodes 330 will match the previously-stored data digests that were created when the data was originally stored. If the data has changed after being stored in the consortium blockchain, the signed data digests of the retrieved data will not match those that were stored in the public blockchain 356 when the data was originally stored.

In some cases, the verification system 316 may only request signed data digests at 520 from the verification nodes that successfully inserted their signed data digests into the public blockchain 356. For example, the verification nodes 330 can each attempt to store a unique identifier (e.g., a public key) identifying the particular node along with the data digest. Only entries that are included in the consensus version of the public blockchain 356 will thus be queried.

In some cases, the verification system 316 may only request verification from a particular set of the verification nodes 330 when storing data to the consortium blockchain 306. In such a case, the verification system 316 may only query the particular set of nodes for signed data digests when verifying that retrieved data from the consortium blockchain 306 has not changed.

Figure 6:
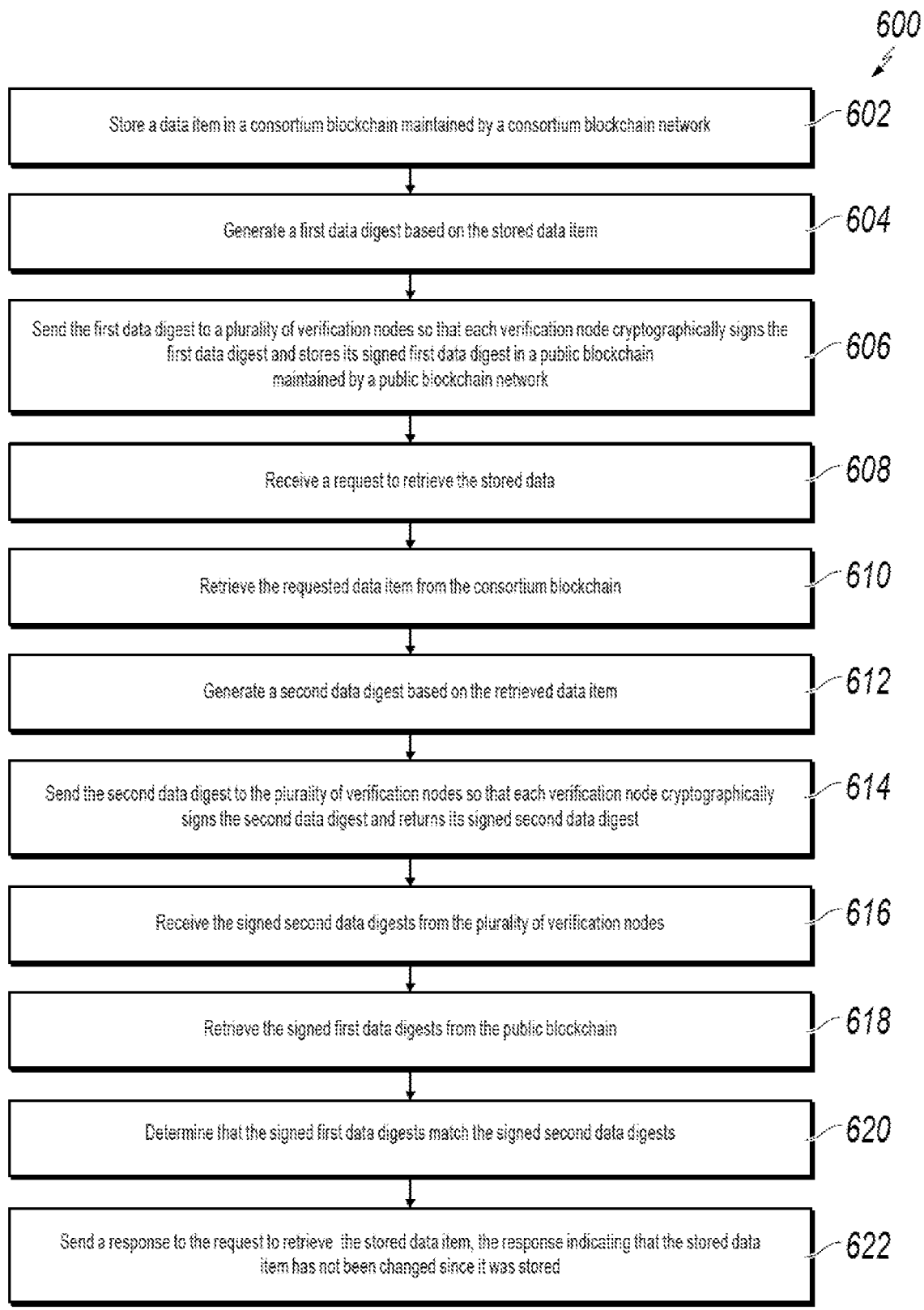
FIG. 6 depicts an example of a process that can be executed in accordance with implementations of the present specification.

FIG. 6 depicts an example of process 600 that can be executed in accordance with implementations of the present specification. In some implementations, the example of process 600 may be performed using one or more computer-executable programs executed using one or more computing devices. For clarity of presentation, the description that follows generally describes process 600 in the context of the other figures in this description. However, it will be understood that process 600 may be performed, for example, by any suitable system, environment, software, and hardware, or a combination of systems, environments, software, and hardware, as appropriate. In some implementations, various steps of process 600 can be run in parallel, in combination, in loops, or in any order.

At 602, a data item is stored in a consortium blockchain maintained by a consortium blockchain network.

At 604, a first data digest is generated based on the stored data item.

At 606, the first data digest is sent to verification nodes, so that each verification node cryptographically signs the first data digest and stores its signed first data digest in a public blockchain maintained by a public blockchain network. In some implementations, the verification nodes are computing devices participating in the public blockchain network. In some implementations, each verification node is configured to cryptographically sign the first data digest using a private key associated with that verification node. In some implementations, sending the first data digest to the verification nodes includes broadcasting the first data digest to the public blockchain network.

At 608, a request is received to retrieve the stored data item.

At 610, in response to receiving the request, the requested data item is retrieved from the consortium blockchain.

At 612, a second data digest is generated based on the retrieved data item. In some implementations, generating the first data digest includes calculating a hash of the stored data item.

At 614, the second data digest is sent to the verification nodes so that each verification node can cryptographically sign the second data digests and return its signed second data digest.

At 616, the signed second data digests are received from the verification nodes.

At 618, the signed first data digests are retrieved from the public blockchain. In some implementations, retrieving the signed first data digests from the public blockchain includes identifying the signed first data digests based on an identifier associated with the stored data item and stored in the public blockchain.

At 620, it is determined that the signed first data digests match the signed second data digests.

At 622, in response to the determining, a response is sent to retrieve the stored data item, the response indicating that the stored data item has not changed since it was stored.

In some implementations, the process 600 further includes storing a smart contract in the public blockchain, wherein the smart contract is configured to provide a monetary reward to the verification nodes in response to receiving the requested signed second data digests from the verification nodes.

Figure 7:
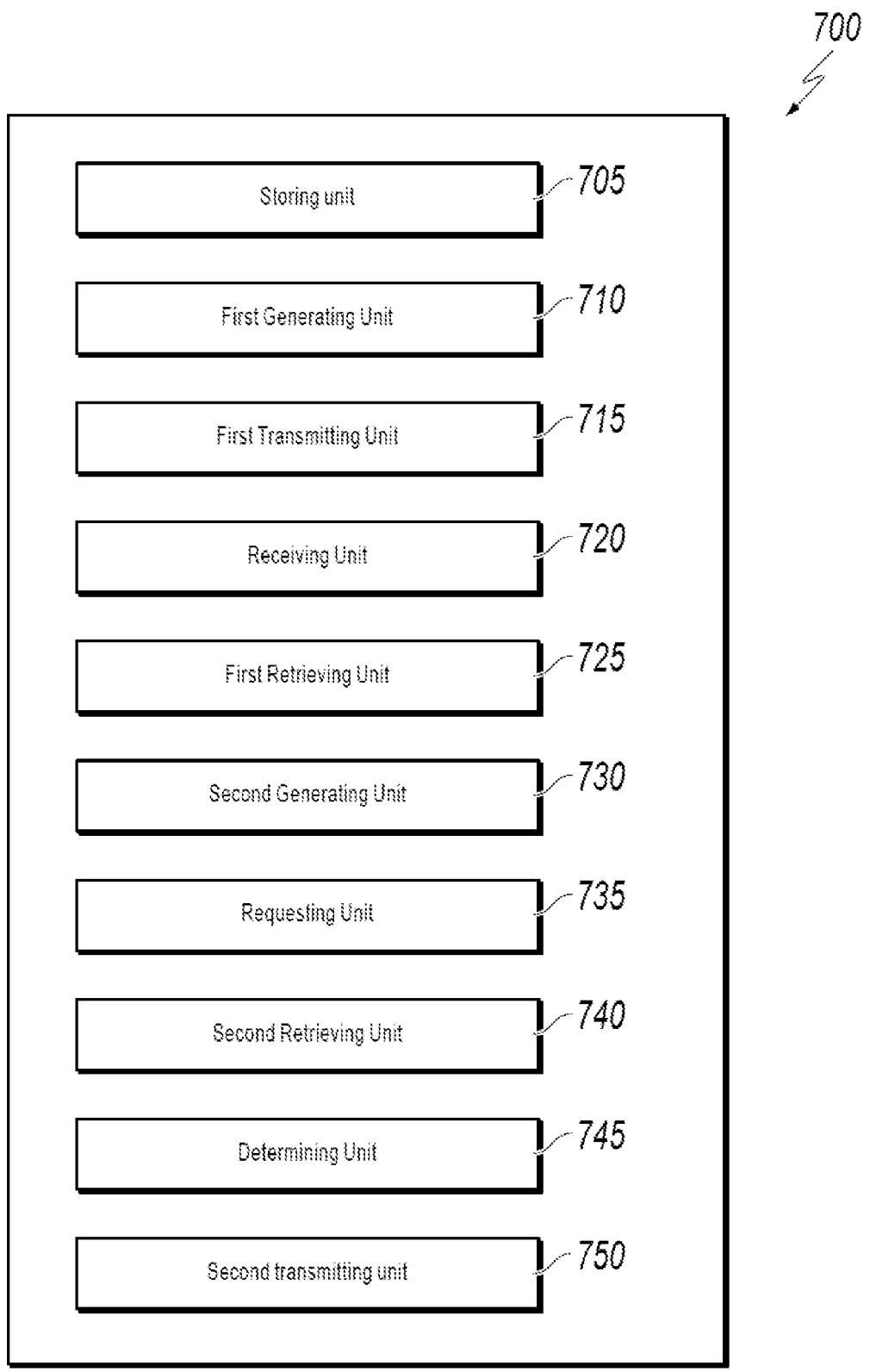
FIG. 7 depicts an example of a diagram illustrating modules of an apparatus in accordance with implementations of the specification.

Referring to FIG. 7, FIG. 7 depicts an example of a diagram illustrating modules of an apparatus 700 in accordance with implementations of the specification. The apparatus 700 can be an example implementation for storing and retrieving to-be-verified data associated with nodes of a blockchain network. The apparatus 700 can correspond to the implementation shown in FIGS. 3-5, and the apparatus 700 includes the following: a storage or storing unit 705, configured to store a data item in a consortium blockchain maintained a consortium blockchain network; a first generator or generating unit 710, configured to generate a first data digest based on the stored data item; a first transmitter or transmitting unit 715, configured to send the first data digest to verification nodes, each verification node configured to cryptographically sign its first data digest and store its signed first data digest in a public blockchain maintained by the public blockchain network; a receiver or a receiving unit 720, configured to receive a request to retrieve the stored data item; a first retrieving unit 725, configured to retrieve the requested data item from the consortium blockchain in response to receiving the request; a second generator or generating unit 730, configured to generate a second data digest based on the retrieved data item; a requestor or requesting unit 735, configured to request assigned second data digests from the verification nodes and in response to receiving the requested signed second data digests from the verification nodes; a second retrieving unit 740, configured to retrieve the signed first data digests from the public blockchain; a determining unit 745, configured to determine that the signed first data digests from the public blockchain match the signed second data digests received from the verification nodes; a second transmitter or transmitting unit 750, configured to send a response to the request to retrieve the stored data including the stored data item in response to the determining, the response indicating that the stored data item has not changed since it was stored.

In an optional implementation, the verification nodes are computing devices participating in the public blockchain network.

In an optional implementation, the apparatus 700 further includes the following: a storage or storing sub-unit, configured to store a smart contract in the public blockchain, wherein the smart contract is configured to provide a monetary reward to the verification nodes in response to receiving the requested signed second data digests from the verification nodes.

In an optional implementation, the apparatus 700 further includes the following: a calculator or a calculating sub-unit, configured to calculate a hash of the stored data item.

In an optional implementation, each verification node is configured to cryptographically sign the first data digest using a private key associated with that verification node.

In an optional implementation, the apparatus 700 further includes the following: a broadcasting sub-unit, configured to broadcast the first data digest to the public blockchain network.

In an optional implementation, the apparatus 700 further includes the following: an identifier or an identifying sub-unit, configured to identify the signed first data digests based on an identifier associated with the stored data item and stored in the public blockchain.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

FIG. 7 is a schematic diagram illustrating an internal functional module and a structure of a consortium blockchain network apparatus. An execution body in essence can be an electronic device, and the electronic device includes the following: one or more processors; and a memory configured to store an executable instruction of the one or more processors.

The one or more processors are configured to store a data item in a consortium blockchain maintained by a consortium blockchain network; generate a first data digest based on the stored data item; send the first data digest to verification nodes, each verification node configured to cryptographically sign the first data digest and store its signed first data digest in a public blockchain maintained by a public blockchain network; receive a request to retrieve the stored data item; in response to receive the request, retrieve the requested data item from the consortium blockchain; generate a second data digest based on the retrieved data item; request signed second data digests from the verification nodes and in response to receive the requested signed second data digests from the nodes; retrieve the signed first data digests from the public blockchain; determine that the signed first data digests from the public blockchain match the signed second data digests received from the verification nodes; and in response to the determine, send a response to the request to retrieve the stored data including the stored data item, the response indicating that the stored data item has not changed since it was stored.

Optionally, the verification nodes are computing devices participating in the public blockchain network.

Optionally, the one or more processors are configured to store a smart contract in the public blockchain, wherein the smart contract is configured to provide a monetary reward to the verification nodes in response to receiving the requested signed second data digests from the verification nodes.

Optionally, the one or more processors are configured to calculate a hash of the stored data item.

Optionally, each verification node is configured to cryptographically sign the first data digest using a private key associated with that verification node.

Optionally, the one or more processors are configured to broadcast the first data digest to the public blockchain network.

Optionally, the one or more processors are configured to identify the signed first data digests based on an identifier associated with the stored data item and stored in the public blockchain.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will be coupled to at least one non-transitory computer-readable storage medium (also referred to as a computer-readable memory). The storage medium coupled to the computer can be an internal component of the computer (e.g., an integrated hard drive) or an external component (e.g., universal serial bus (USB) hard drive or a storage system accessed over a network). Examples of storage media can include, for example, magnetic, magneto optical, or optical disks, solid state drives, network storage resources such as cloud storage systems, or other types of storage media. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method, comprising:
    sending, to each of a plurality of verification nodes, a first data digest generated based on a data item initially stored in a consortium blockchain, the first data digest being cryptographically signed and stored in a public blockchain as a cryptographically signed first data digest;
    receiving a request to retrieve the data item;
    generating, based upon the request to retrieve the data item, a second data digest based on the data item;
    sending the second data digest to the plurality of verification nodes that cryptographically sign the second data digest and return a cryptographically signed second data digest; and
    based upon the stored cryptographically signed first data digest matching the returned cryptographically signed second data digest, sending a response to the request to retrieve the data item indicating that the data item has not changed since the data item was initially stored in the consortium blockchain.

2. The computer-implemented method of claim 1, wherein the plurality of verification nodes are computing devices participating in the public blockchain.

3. The computer-implemented method of claim 1, further comprising:
    storing, in the public blockchain, a smart contract configured to provide a monetary reward to the verification nodes in response to receiving the cryptographically signed second data digest from the verification nodes.

4. The computer-implemented method of claim 1, wherein the first data digest is generated using a hash of the initially stored data item.

5. The computer-implemented method of claim 1, wherein each verification node is configured to cryptographically sign the first data digest using a private key associated with that verification node.

6. The computer-implemented method of claim 1, wherein sending the first data digest to the plurality of verification nodes includes broadcasting the first data digest to a public blockchain network that manages the public blockchain.

7. The computer-implemented method of claim 1, further comprising:
    identifying the cryptographically signed first data digest stored in the public blockchain based on an identifier associated with the data item; and
    retrieving the cryptographically signed first data digest from the public blockchain.

8. A non-transitory computer-readable storage medium storing one or more instructions executable by a computer system to perform operations comprising:
    sending, to each of a plurality of verification nodes, a first data digest generated based on a data item initially stored in a consortium blockchain, the first data digest being cryptographically signed and stored in a public blockchain as a cryptographically signed first data digest;
    receiving a request to retrieve the data item;
    generating, based upon the request to retrieve the data item, a second data digest based on the data item;
    sending the second data digest to the plurality of verification nodes that cryptographically sign the second data digest and return a cryptographically signed second data digest; and
    based upon the stored cryptographically signed first data digest matching the returned cryptographically signed second data digest, sending a response to the request to retrieve the data item indicating that the data item has not changed since the data item was initially stored in the consortium blockchain.

9. The non-transitory computer-readable storage medium of claim 8, wherein the plurality of verification nodes are computing devices participating in the public blockchain.

10. The non-transitory computer-readable storage medium of claim 8, wherein the operations comprise:

storing, in the public blockchain, a smart contract configured to provide a monetary reward to the verification nodes in response to receiving the cryptographically signed second data digest from the verification nodes.

11. The non-transitory computer-readable storage medium of claim 8, wherein the first data digest is generated using a hash of the data item.

12. The non-transitory computer-readable storage medium of claim 8, wherein each verification node is configured to cryptographically sign the first data digest using a private key associated with that verification node.

13. The non-transitory computer-readable storage medium of claim 8, wherein sending the first data digest to the plurality of verification nodes includes broadcasting the first data digest to a public blockchain network that manages the public blockchain.

14. The non-transitory computer-readable storage medium of claim 8, wherein the operations comprise:
identifying the cryptographically signed first data digest stored in the public blockchain based on an identifier associated with the data item; and
retrieving the cryptographically signed first data digest from the public blockchain.

15. A system, comprising:
one or more computers; and
one or more computer memory devices interoperably coupled with the one or more computers and having tangible, non-transitory, machine-readable media storing one or more instructions that, when executed by the one or more computers, perform one or more operations comprising:
sending, to each of a plurality of verification nodes, a first data digest generated based on a data item initially stored in a consortium blockchain, the first data digest being cryptographically signed and stored in a public blockchain as a cryptographically signed first data digest;
receiving a request to retrieve the data item;
generating, based upon the request to retrieve the data item, a second data digest based on the data item;
sending the second data digest to the plurality of verification nodes that cryptographically sign the second data digest and return a cryptographically signed second data digest; and
based upon the stored cryptographically signed first data digest matching the returned cryptographically signed second data digest, sending a response to the request to retrieve the data item indicating that the data item has not changed since the data item was initially stored in the consortium blockchain.

16. The system of claim 15, wherein the plurality of verification nodes are computing devices participating in the public blockchain.

17. The system of claim 15, wherein the operations further comprise:
storing, in the public blockchain, a smart contract configured to provide a monetary reward to the verification nodes in response to receiving the cryptographically signed second data digest from the verification nodes.

18. The system of claim 15, wherein each verification node is configured to cryptographically sign the first data digest using a private key associated with that verification node.

19. The system of claim 15, wherein sending the first data digest to the plurality of verification nodes includes broadcasting the first data digest to a public blockchain network that manages the public blockchain.

20. The system of claim 15, wherein the operations further comprise:
identifying the cryptographically signed first data digest stored in the public blockchain based on an identifier associated with the data item; and
retrieving the cryptographically signed first data digest from the public blockchain.

* * * * *